Dec. 20, 1949     E. M. IRWIN     2,491,736
MAGNETIC PICKUP DEVICE AND METHOD
OF BALANCING THE DEVICE

Filed April 18, 1946     2 Sheets-Sheet 1

INVENTOR
Emmett M. Irwin
BY
Pennie Edmonds Morton Barrows
ATTORNEYS

Dec. 20, 1949  E. M. IRWIN  2,491,736
MAGNETIC PICKUP DEVICE AND METHOD
OF BALANCING THE DEVICE
Filed April 18, 1946  2 Sheets-Sheet 2
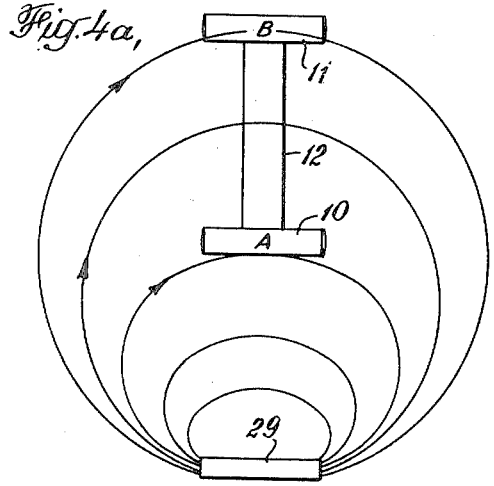
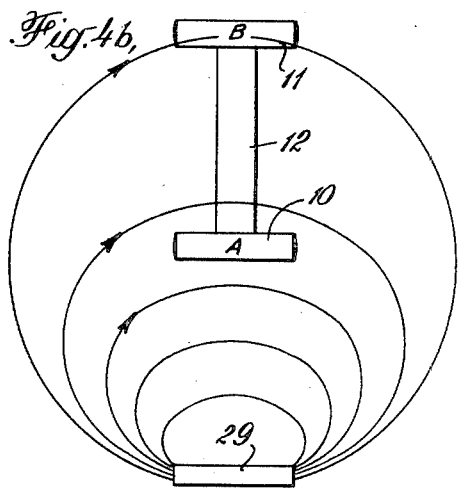
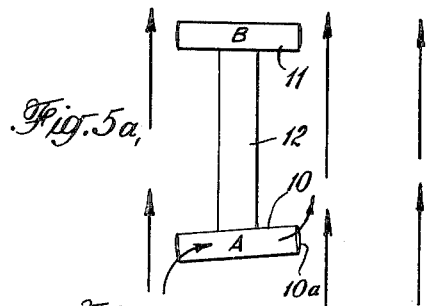
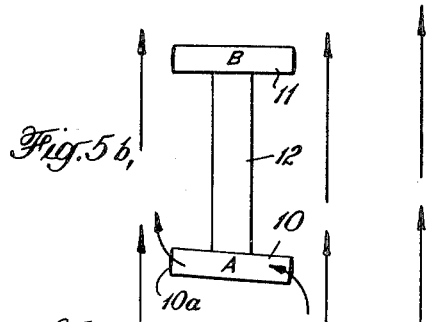
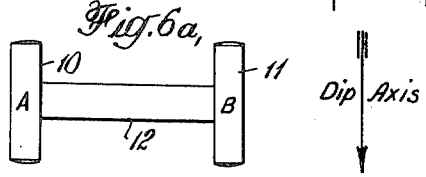
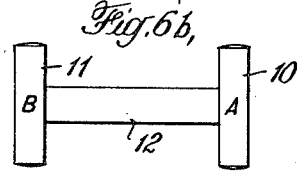
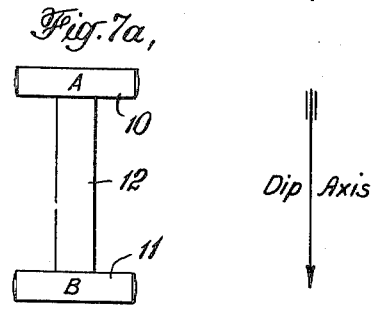
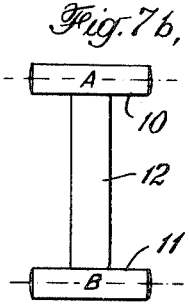
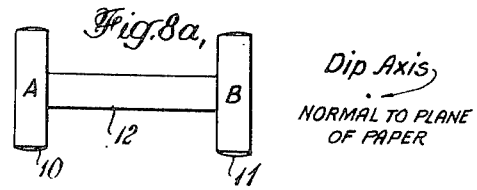
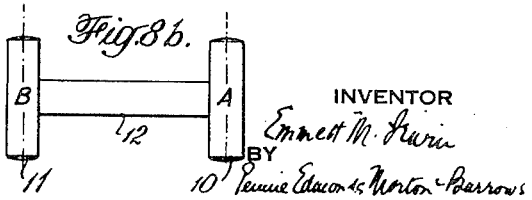
INVENTOR
Emmett M. Irwin
BY
Pennie Edmonds Morton Barrows
ATTORNEYS Patented Dec. 20, 1949

2,491,736

UNITED STATES PATENT OFFICE 2,491,736

MAGNETIC PICKUP DEVICE AND METHOD OF BALANCING THE DEVICE

Emmett M. Irwin, San Marino, Calif.

Application April 18, 1946, Serial No. 663,100

11 Claims. (Cl. 175—183)

This invention relates to the indication of magnetic fields and the measurement of their strength. More particularly, the invention is concerned with a novel apparatus by which the magnetic gradient of a non-uniform magnetic field may be readily indicated and measured, and with a new method by which that apparatus may be easily adjusted and balanced, so that it will give accurate indications and measurements.

The instrument of the prior application includes a pair of magnetic pick-up units, each of which is complete in itself and is capable, when placed in a magnetic field, of producing an output proportional to the strength of the field and of a polarity depending upon the position of the unit in the field. The units are electrically connected so that their outputs are in opposition and they are mechanically connected, so that their directions of pick-up or magnetic axes are parallel. The units are of identical pick-up sensitivity and, if the instrument is placed in a uniform magnetic field, it will produce no response, regardless of its position in the field, since the individual units produce equal and opposite responses. When the instrument is placed in a non-uniform magnetic field, such as that about a magnetized body, it will, if properly oriented, produce a response, since the unit lying nearer the body will produce a greater output than the unit farther away. By shifting the instrument to different positions in the field, until the maximum output is obtained, the location of the body may be determined, since, when the device is placed for maximum output, the axis of the mechanical connection between the units will, if extended, pass through the body.

In order that the instrument of the prior application may function properly and give accurate indications, it is necessary that it be in exact balance so that it may be shifted to any position in a uniform magnetic field without producing an output. When the instrument is in such balanced condition, the two pick-up units are of identical pick-up sensitivity and their magnetic axes are parallel. In the manufacture of the instrument, it is not always possible to produce units of exactly the same pick-up sensitivity or to mount these units accurately with their magnetic axes parallel. Also, an initially balanced instrument may become unbalanced in service as a result of handling or of local operating conditions. In the balancing of such an instrument, it is desirable to seek a location free of magnetic gradients, so that such gradients will have no effect upon the balancing operations. Experience has shown, however, that it is almost impossible to find a location in which there is not some magnetic gradient, and even the earth's field is not strictly a uniform field, since its strength varies with the distance above the earth's surface and the variation is capable of determination by a sensitive instrument. Accordingly, the balancing of the instrument of the prior application has presented great difficulties.

The present invention is directed to the provision of an improved apparatus of the type disclosed in the co-pending application, which is so constructed that the balancing thereof may be readily effected in the presence of a non-uniform magnetic field, and of a method by which the new instrument may be rapidly brought to a balanced condition in the factory or at the place of use. In the new instrument, one of the pick-up units is attached to the connecting arm for angular adjustment about an axis which lies normal to the axis of the arm and to the magnetic axis of the unit. The other pick-up unit is attached to the arm for angular adjustment about the axis of the arm. In addition, electrical means are provided for varying the net output of one unit so that it may be caused to equal that of the other.

For a better understanding of the invention, reference may be made to the accompanying drawings in which:

Figs. 4a and 4b are diagrams illustrating the manner in which a balanced instrument responds when placed in a non-uniform magnetic field;

Figs. 5a and 5b are diagrams showing the response of an unbalanced instrument in a uniform field;

Figs. 6a and 6b are diagrams illustrating the operation of balancing the instrument so that the pick-up units are of equal output;

Figs. 7a and 7b are diagrams illustrating the operation of balancing the instrument so that the magnetic axes of the pick-up units lie in parallel planes, although the axes are not necessarily parallel; and Figs. 8a and 8b are diagrams illustrating the operation of balancing the instrument so that the magnetic axes of the units will lie in the same plane, although the axes are not necessarily parallel.

Figure 2:
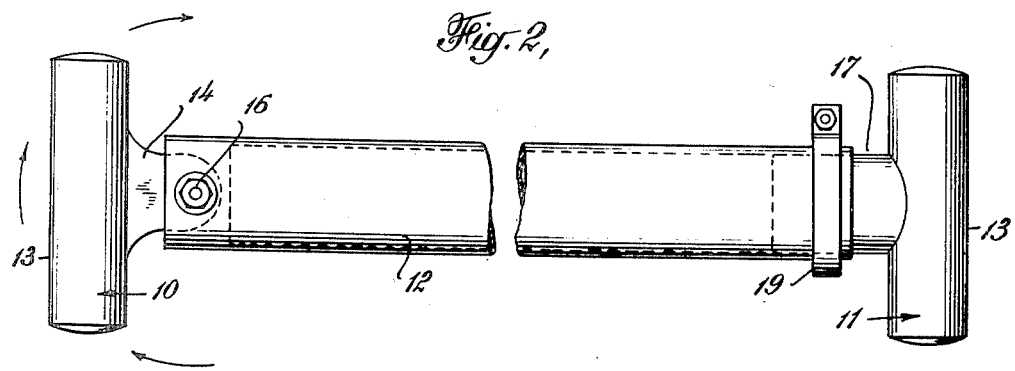
Fig. 2 is a plan view of one form of the apparatus.
Figure 3:
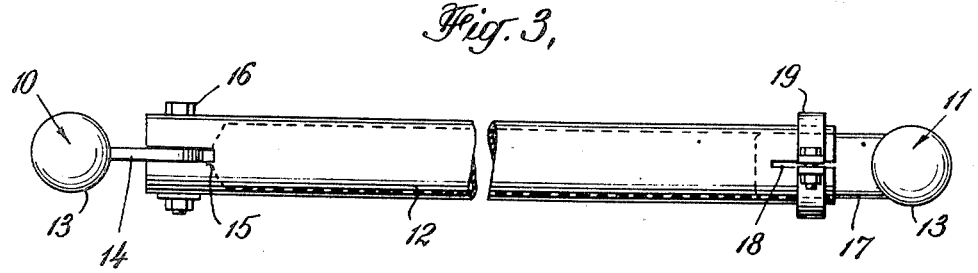
Fig. 3 is a view of the apparatus in side elevation.

The instrument illustrated in Figs. 2 and 3 comprises a pair of pick-up units 10, 11 mounted at opposite ends of a supporting and spacing arm 12. The units are contained within housings 13 and the unit 10 is mounted on the arm 12 for angular adjustment about an axis normal to the axis of arm 12 and to the magnetic axis of the unit. Various types of mounting for securing the unit 10 to the arm 12 may be employed for the purpose, and, in the construction illustrated, the housing of the unit is provided with an ear 14 which enters diametrical slot 15 in the end of the arm 13. A bolt 16 is passed through the bifurcated ends of arm 12 and through the ear. The plane of the ear passes through the axis of the housing and the bolt 16 is mounted diametrically with respect to the axis of arm 12 and it passes at right angles through the ear 14. With this arrangement, the loosening of the nut on the bolt permits the unit 10 to be swung angularly about the bolt as a center, and when the unit is in proper position, the nut may be tightened to clamp the ear and thus hold the unit in the desired position of adjustment.

The unit 11 is mounted on arm 12 for angular adjustment about the axis of the arm and various adjustable mountings may be employed for the purpose. In the construction illustrated, the housing 13 of the unit is provided with an extension 17 of tubular form which projects from the housing and lies with its axis at right angles to the axis of the housing. The end of the extension enters a recess in the end of arm 12 and the wall of the recess is longitudinally slotted at 18. A strap clamp 19 encircles the slotted end of arm 12 and the ends of the clamp are connected by a bolt. By loosening the nut on the bolt to release the clamp, the extension 17 is released and the unit 11 can then be rotated about the axis of arm 12 and secured in any desired angular position of adjustment.

The pick-up units employed in the instrument may be of any desired type, but I prefer to employ pick-up units or magnetometers of the construction disclosed in my co-pending application Serial No. 497,183, filed August 3, 1943, now Patent No. 2,418,553. Each such unit includes a core 20 of a suitable ferromagnetic material of good permeability, the core being made of T-shape and including one or more laminations. An exciting coil 21 is mounted on the leg of the core, and secondary coils 22 are mounted on the cross-bar on each side of the leg. A pick-up wing 23 extends outwardly from each end of the cross-bar of the core in alignment therewith. The exciting coils are supplied with alternating current from the same source. The secondary coils are connected electrically, so that their outputs are in opposition and the two pick-up units are likewise connected electrically so that their outputs are in opposition. A phasing condenser 24 is connected across the terminals of each unit and means are provided for varying the net output of one unit so that it will match or balance that of the other. In the diagram shown in Fig. 1, the unit 11 is of higher output than unit 10, and the output of this unit is fed into a potentiometer circuit which may include a resistance 25 in series with the unit and a resistance 26 in parallel, although the resistance 26 may ordinarily be dispensed with and is used only when commercial resistance units available for use as resistance 25 do not give sufficiently close control. The resistances 25, 26 are variable, and, by properly adjusting them, the net output of unit 11 may be so reduced as to cause it to exactly equal that of unit 10. The units are grounded at 27 and a connection 28 leads to an amplifier and indicating device.

In order to make clear the operations of balancing the new instrument in accordance with the method of the invention, I have illustrated in Figs. 4a and 4b the effect of changing the position of an exactly balanced instrument in a non-uniform field, such as that produced by a magnet 29. When the instrument is placed with the axis of its connecting arm 12 directed toward the magnet, the instrument will give a response, because, although the magnetic flux is passing in the same direction through both pick-up units, the concentration of flux passing through unit 10 is greater than that through unit 11. Accordingly, unit 10 will have the greater output and the instrument will give a corresponding indication. When the balancing instrument is rotated through 180° about the axis of its connecting arm 12, to the position shown in Fig. 4b, the flux will again pass through the two units, but the concentration of flux will be greater in unit 10 than in unit 11 so that an output will result. As flux passes through the two units in opposite directions in the two cases illustrated in Figs. 4a and 4b, the indicating device will give opposite indications, as, for example, its needle may move from its zero position to the right, in the first instance, and to the left, in the second.

When an exactly balanced instrument is placed in a uniform magnetic field, it will produce no output, since the outputs of individual units will be equal and opposite. However, if the instrument is unbalanced, as for example, in the respect that the magnetic axes of the units lie in the same plane but are not parallel, or those axes lie in parallel planes but are not themselves parallel, the instrument, if placed in a uniform field, will produce an output and give an indication. This is illustrated in Figs. 5a, 5b, in which the instrument shown is unbalanced in the respect that unit 11 lies with its magnetic axis normal to the axis of the connecting arm 12, while unit 10 lies with its magnetic axis at other than a right angle to the axis of arm 12. When this instrument is placed in a uniform field as shown in Fig. 5a, no flux will pass through unit 11 but some of the flux will pass through unit 10 toward its end 10a. When the instrument is rotated through 180° about the axis of its arm 12, no flux will pass through unit 11 in the new position of the instrument, but flux will again pass through unit 10 toward its end 10a. The instrument, accordingly, has a net output in each position and the output is of the same sign in both positions.

Ordinarily, a non-uniform field may be resolved into a uniform and a non-uniform component and, in order to balance the instrument in the presence of such a non-uniform field, it is initially oriented so that the axis of its connecting arm is parallel to the direction of the uniform field component, and a reading is taken. The instrument is then rotated through 180° about the axis of the connecting arm, and another reading taken. If the two readings are equal and opposite as, for example, 10 units to the left in one case and 10 units to the right in the other, then it is clear that the instrument is in a field containing a non-uniform component, that the instrument is in balance, and that the gradient of the non-uniform field is 10 units. If, however, the readings are, for example, 10 units to the left in the first instance, and 10 units to the left again in the second, then it is evident that there is no gradient present, and that an unbalance amounting to 10 units exists in the instrument. Ordinarily, since there is nearly always a non-uniform field of some value present wherever the balancing operation takes place, the reading given by a slightly unbalanced instrument when placed in the two positions described, is likely to be, for example, 5 units to the right in one case and 15 units to the left in the other. In such circumstances, it is evident that there is an unbalance in the instrument of 5 units to the left and that it lies within a non-uniform field in which the gradient is 10 units.

Figure 1:
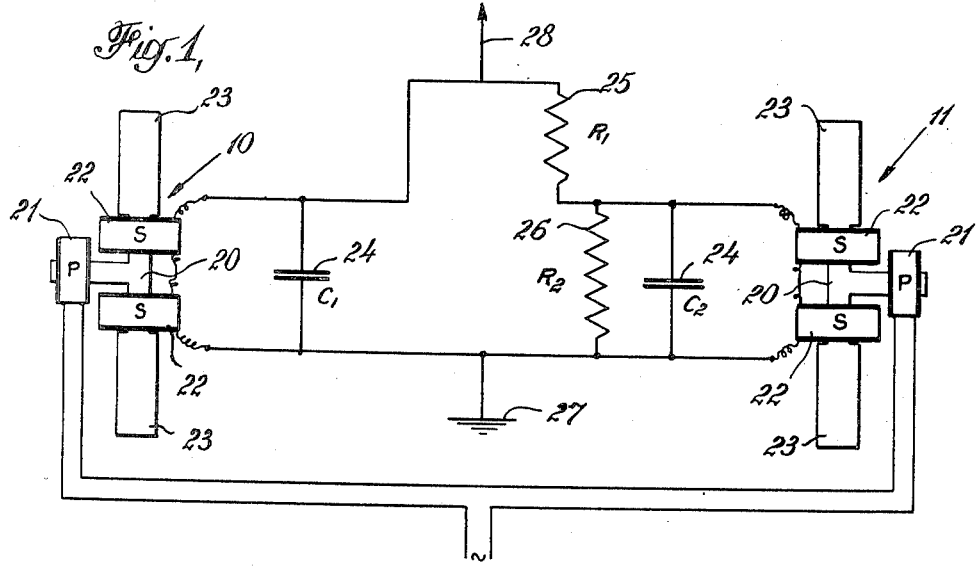
Figure 1 is a wiring diagram of the apparatus of the invention.

In balancing the instrument of the invention, in accordance with the new method, it is balanced about three axes by the procedure shown in Figs. 6a to 8b, inclusive. The first balancing operation is that shown in Figs. 6a and 6b, in which the instrument is first placed (Fig. 6a), so that the mechanical axis of the device is normal to the dip axis of the earth's field and the axes of the units 10 and 11 appear to be parallel to the dip axis, after which a reading is taken. The instrument is then rotated through 180° about one of its principal transverse axes, namely, an axis parallel to the dip axis and lying midway between the units, after which a second reading is taken. If the readings are not equal and opposite in sign, then it is evident that the outputs of the units are not equal, and the larger output is then reduced by some means, such as resistances 25, 26 as shown in Fig. 1, until the net outputs of the units are equal as indicated by the instrument giving equal and opposite readings in the two positions shown in Figs. 6a and 6b.

In order to balance the instrument to insure that the magnetic axes of the pick-up units lie in parallel planes, although they are themselves not necessarily parallel, the instrument is oriented with the axis of its connecting arm parallel to the dip axis of the earth's field, and the magnetic axes of units 10 and 11 substantially normal to the dip axis, as shown in Fig. 7a, after which a reading is taken. The instrument is then rotated through 180° about its principal longitudinal axis, namely, the axis of its arm 12, to the position shown in Fig. 7b, and another reading is taken. If the readings are not equal in value and opposite in sign, then it is evident that one of the units does not lie with its magnetic axis normal to the axis of arm 12 and the nut on bolt 16 is loosened, and the unit 10 is angularly adjusted with reference to arm 12, until the equal and opposite indications are given for the two positions of the instrument above referred to.

The third balancing operation illustrated in Figs. 8a and 8b is carried on to insure that the magnetic axes of the units lie in the same plane, although the magnetic axes are not necessarily parallel to one another. In the first step in this operation, the instrument is placed so that the axis of the connecting arm of the device is normal to the dip axis of the earth's field and the magnetic axes of the pick-up units appear to be normal to the dip axis, after which a reading is taken. The instrument is then rotated 180° about its other principal transverse axis, namely, an axis parallel to the dip axis and midway between the magnetic axes of the units, and a second reading is taken. If the readings are not equal in value and opposite in sign, it is evident that the magnetic axes of the two units do not lie in the same plane. The angular position of unit 11 with reference to the arm 12 may then be altered by releasing clamp 19 and rotating the unit 11 about the axis of arm 12, until the instrument gives equal and opposite readings in the two different positions referred to.

The practice of the method described will produce an exactly balanced instrument, although it is to be understood that sometimes, the carrying out of a step in the method may adversely affect the result obtained by carrying out a preceding step. The consequence is that the attainment of the final precise balance is usually a progressive operation, in which certain steps of the method may be repeated.

I claim:

1. A method of balancing a device including a pair of magnetic pick-up units mechanically connected to lie a fixed distance from one another and with their magnetic axes substantially parallel, and electrically connected with their outputs in opposition, which comprises placing the device in a magnetic field composed of the earth's field and a non-uniform field component, with the mechanical axis of the device normal to the dip axis of the earth's field and with the magnetic axes of the units substantially parallel to the dip axis and observing the output of the device, rotating the device through 180° about an axis parallel to said dip axis and lying midway between the magnetic axes of the units and observing the output, electrically reducing the net output of one unit until the outputs of the device in the two positions are equal in value and opposite in sign, moving the device to place its mechanical axis parallel to said dip axis and observing its output, rotating the device through 180° about its mechanical axis and observing the output, altering the relative positions of the units until the outputs of the device in the second two positions are equal in value and opposite in sign, placing the device with its mechanical axis normal to the dip axis of the earth's field and with the magnetic axes of its units substantially normal to said dip axis and observing the output, rotating the device through 180° about an axis parallel to said dip axis and midway between the magnetic axes of the units and observing the output, and altering the relative positions of the units until the outputs of the device in the third two positions are equal in value and opposite in sign.

2. A method of balancing a device including a pair of magnetic pick-up units mechanically connected to lie a fixed distance from one another and with their magnetic axes substantially parallel, and electrically connected with their outputs in opposition, which comprises placing the device in a magnetic field composed of the earth's field and a non-uniform field component with the mechanical axis of the device normal to the dip axis of the earth's field and with the magnetic axes of the units substantially parallel to the dip axis and observing the output of the device, rotating the device through 180° about an axis parallel to said dip axis and lying midway between the magnetic axes of the units and observing the output, electrically reducing the net output of one unit until the outputs of the device in the two positions are equal in value and opposite in sign, moving the device to place its mechanical axis parallel to said dip axis and observing its output, rotating the device through 180° about its mechanical axis and observing the output, altering the relative positions of the units about an axis lying normal to the magnetic axes of the units and to the mechanical axis of the device until the outputs of the device in the second two positions are equal in value and opposite in sign, placing the device with its mechanical axis normal to the dip axis of the earth's field and with the magnetic axes of its units substantially normal to said dip axis and observing the output, rotating the device through 180° about an axis parallel to said dip axis and midway between the magnetic axes of the units and observing the output, and altering the relative positions of the units until the outputs of the devices in the third two positions are equal in value and opposite in sign.

3. A method of balancing a device including a pair of magnetic pick-up units mechanically connected to lie a fixed distance from one another and with their magnetic axes substantially parallel, and electrically connected with their outputs in opposition, which comprises placing the device in a magnetic field composed of the earth's field and a non-uniform field component, with the mechanical axis of the device normal to the dip axis of the earth's field and with the magnetic axes of the units substantially parallel to the dip axis and observing the output of the device, rotating the device through 180° about an axis parallel to said dip axis and lying midway between the magnetic axes of the units and observing the output, electrically reducing the net output of one unit until the outputs of the device in the two positions are equal in value and opposite in sign, moving the device to place its mechanical axis parallel to said dip axis and observing its output, rotating the device through 180° about its mechanical axis and observing the output, altering the relative positions of the units until the outputs of the device in the second two positions are equal in value and opposite in sign, placing the device with its mechanical axis normal to the dip axis of the earth's field and with the magnetic axes of its units substantially normal to said dip axis and observing the output, rotating the device through 180° about an axis parallel to said dip axis and midway between the magnetic axes of its units and observing the output, and altering the relative positions of the units angularly about said mechanical axis until the output of the device in the third two positions are equal in value and opposite in sign.

4. A method of balancing a device including a pair of magnetic pick-up units mechanically connected to lie a fixed distance from one another and with their magnetic axes substantially parallel, and electrically connected with their outputs in opposition, which comprises placing the device in a magnetic field composed of the earth's field and a non-uniform field component, with the mechanical axis of the device normal to the dip axis of the earth's field and with the magnetic axes of the units substantially parallel to the dip axis and observing the output of the device, rotating the device through 180° about an axis parallel to said dip axis and lying midway between the magnetic axes of the units and observing the output, electrically reducing the net output of one unit until the outputs of the device in the two positions are equal in value and opposite in sign, moving the device to place its mechanical axis parallel to said dip axis and observing its output, rotating the device through 180° about its mechanical axis and observing the output, altering the relative positions of the units about an axis lying normal to the magnetic axes of the units and to the mechanical axis of the device until the outputs of the device in the second two positions are equal in value and opposite in sign, placing the device with its mechanical axis normal to the dip axis of the earth's field and with the magnetic axes of its units substantially normal to said dip axis and observing the output, rotating the device through 180° about an axis parallel to said dip axis and midway between the magnetic axes of the units and observing the output, and altering the relative positions of the units angularly about said mechanical axis until the outputs of the device in the third two positions are equal in value and opposite in sign.

5. A method of balancing a device including a pair of magnetic pick-up units mechanically connected to lie a fixed distance from one another and electrically connected with their outputs in opposition, the units being adjustable so that their magnetic axes can be made parallel, which comprises placing the device in a magnetic field having a uniform and a non-uniform field component, with the mechanical axis of the device parallel to the axis of the uniform field component and the magnetic axes of the units substantially normal to the axis of the uniform field component, observing the output of the device, rotating the device through 180° about its mechanical axis, observing the output of the device in the second position, and adjusting the relative positions of the units until the outputs of the device in the two positions are equal in value and opposite in sign.

6. A method of balancing a device including a pair of magnetic pick-up units mechanically connected to lie a fixed distance from one another and electrically connected with their outputs in opposition, the units being adjustable so that their magnetic axes can be made parallel, which comprises placing the device in a magnetic field having a uniform and a non-uniform field component, with the mechanical axis of the device normal to the axis of the uniform field and the magnetic axes of the units substantially normal to said field component axis, observing the output, rotating the device through 180° about an axis parallel to the axis of the uniform field component and midway between the magnetic axes of the units, observing the output of the device in the second position, and adjusting the relative positions of the units until the outputs of the device in the two positions are equal in value and opposite in sign.

7. A method of balancing a device including a pair of magnetic pick-up units mechanically connected to lie a fixed distance from one another and electrically connected with their outputs in opposition, the units being adjustable so that their magnetic axes can be made parallel, which comprises placing the device in a magnetic field having a uniform and a non-uniform field component, with the mechanical axis of the device normal to the axis of the uniform field component and the magnetic axes of the units substantially parallel to said field component axis, observing the output of the device, rotating the device through 180° about an axis parallel to the axis of the uniform field component and midway between the magnetic axes of the units, and electrically adjusting the output of one unit until the outputs of the device in the two positions are equal in value and opposite in sign.

8. A method of determining the balance of a device including a pair of magnetic pick-up units mechanically connected to lie a fixed distance apart and electrically connected with their outputs in opposition, which comprises orienting the device in a magnetic field having a uniform and a non-uniform component, with one of the principal axes of the device lying parallel to the axis of the uniform field component, observing the output of the device, rotating the device through 180° about said principal axis, and comparing the outputs of the device in the two positions.

9. A method of balancing a device including a pair of magnetic pick-up units mechanically connected to lie a fixed distance apart and electrically connected with their outputs in opposition, which comprises orienting the device in a magnetic field having a uniform and a non-uniform component, with one of the principal axes of the device lying parallel to the axis of the uniform field component, observing the output of the device, rotating the device through 180° about said principal axis, observing the output of the device in the second position, and adjusting the relative positions of the units until the outputs of the device in the two positions are equal in value and opposite in sign.

10. A method of balancing a device including a pair of magnetic pick-up units mechanically connected to lie a fixed distance apart and electrically connected with their outputs in opposition, which comprises orienting the device in a magnetic field having a uniform and a nonuniform component, with one of the principal axes of the device lying parallel to the axis of the uniform field component, observing the output of the device, rotating the device through 180° about said principal axis, observing the output of the device in the second position, and electrically adjusting the output of one unit until the outputs of the device in the two positions are equal in value and opposite in sign.

11. A magnetic pick-up device for determining the gradient in a non-uniform magnetic field, which comprises a pair of like angularly adjustable magnetic pick-up units, each capable of producing an output in response to a magnetic field in which the unit is placed, the output being proportional to the strength of the field and of a polarity depending on the position of the unit in the field, means for electrically connecting the units with their outputs in opposition, a rigid member mechanically connected at its ends to the units, means for securing one unit to the member for adjustment to different angular positions about an axis normal to the axis of the member and to the magnetic axis of the unit, and means for securing the other unit to the member with the magnetic axis of the unit at right angles to the axis of the member, said means permitting adjustment of said unit to different angular positions about the axis of the member.

EMMETT M. IRWIN.

REFERENCES CITED

The following references are of record in the file of this patent:

UNITED STATES PATENTS

| Number | Name | Date |
| --- | --- | --- |
| 277,087 | Varley | May 8, 1883 |
| 1,851,818 | Drake et al. | Mar. 29, 1932 |
| 1,896,737 | Zuschlag | Feb. 7, 1933 |
| 2,219,885 | Barnes et al. | Oct. 29, 1940 |
| 2,269,584 | Eldredge | Jan. 13, 1942 |
| 2,335,117 | Harrison | Nov. 23, 1943 |
| 2,379,716 | Hull | July 3, 1945 |
| 2,407,202 | Vacquier | Sept. 3, 1946 |
| 2,412,046 | Hoare | Dec. 3, 1946 |